US 8,854,833 B2

(12) United States Patent
Chen et al.

(10) Patent No.: US 8,854,833 B2
(45) Date of Patent: *Oct. 7, 2014

(54) SERIAL ADVANCED TECHNOLOGY ATTACHMENT DUAL IN-LINE MEMORY MODULE

(75) Inventors: Chun-Po Chen, New Taipei (TW); Chia-Ming Yeh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 140 days.

This patent is subject to a terminal disclaimer.

(21) Appl. No.: 13/284,969

(22) Filed: Oct. 30, 2011

(65) Prior Publication Data

US 2013/0094167 A1 Apr. 18, 2013

(30) Foreign Application Priority Data

Oct. 14, 2011 (TW) .................................. 100137404

(51) Int. Cl.
*H05K 1/11* (2006.01)
*H05K 1/14* (2006.01)
*G06F 1/18* (2006.01)

(52) U.S. Cl.
CPC ..................................... *G06F 1/185* (2013.01)

USPC ............ 361/803; 361/785; 361/784; 361/679

(58) Field of Classification Search
USPC .......................................... 361/803, 784, 679
See application file for complete search history.

(56) References Cited

U.S. PATENT DOCUMENTS 8,125,786 B2 * 2/2012 Nishikawa et al. ........... 361/737
8,514,584 B2 * 8/2013 Liang et al. ................... 361/785

* cited by examiner

*Primary Examiner* — Andargie M Aychillhum
(74) *Attorney, Agent, or Firm* — Novak Druce Connolly Bove + Quigg LLP

(57) ABSTRACT

A serial advanced technology attachment (SATA) dual-in-line memory module (DIMM) includes a circuit board. A control chip and a number of storage chips are arranged on the circuit board. First and second extending boards extend from an end of the circuit board and are coplanar with the circuit board. A space is defined between the first and the second extending boards. A first edge connector is arranged on the first extending board and connected to the control chip. A second edge connector is arranged on bottom edges of the second extending board and the circuit board. A third edge connector is arranged on a top edge of the circuit board opposite to the bottom edge of the circuit board.

4 Claims, 3 Drawing Sheets

SERIAL ADVANCED TECHNOLOGY ATTACHMENT DUAL IN-LINE MEMORY MODULE

BACKGROUND

1. Technical Field

The present disclosure relates to a serial advanced technology attachment (SATA) dual in-line memory module (DIMM).

2. Description of Related Art

At present, solid state drives (SSD) store data on chips instead of on magnetic or optical discs, and are used for adding storage capacity. One type of SSD has the form factor of a DIMM module and is called a SATA DIMM module. The SATA DIMM module can be inserted into a memory slot of a motherboard, to receive voltages from the motherboard through the memory slot and receive hard disk drive (HDD) signals through SATA connectors arranged on the SATA DIMM module and connected to a SATA connector of the motherboard. However, the number of memory slots is limited, thus the motherboard can only receive a limited number of SATA DIMM modules. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by limitation. References to "an" or "one" embodiment in this disclosure are not necessarily to the same embodiment, and such references mean at least one.

Figure 1:
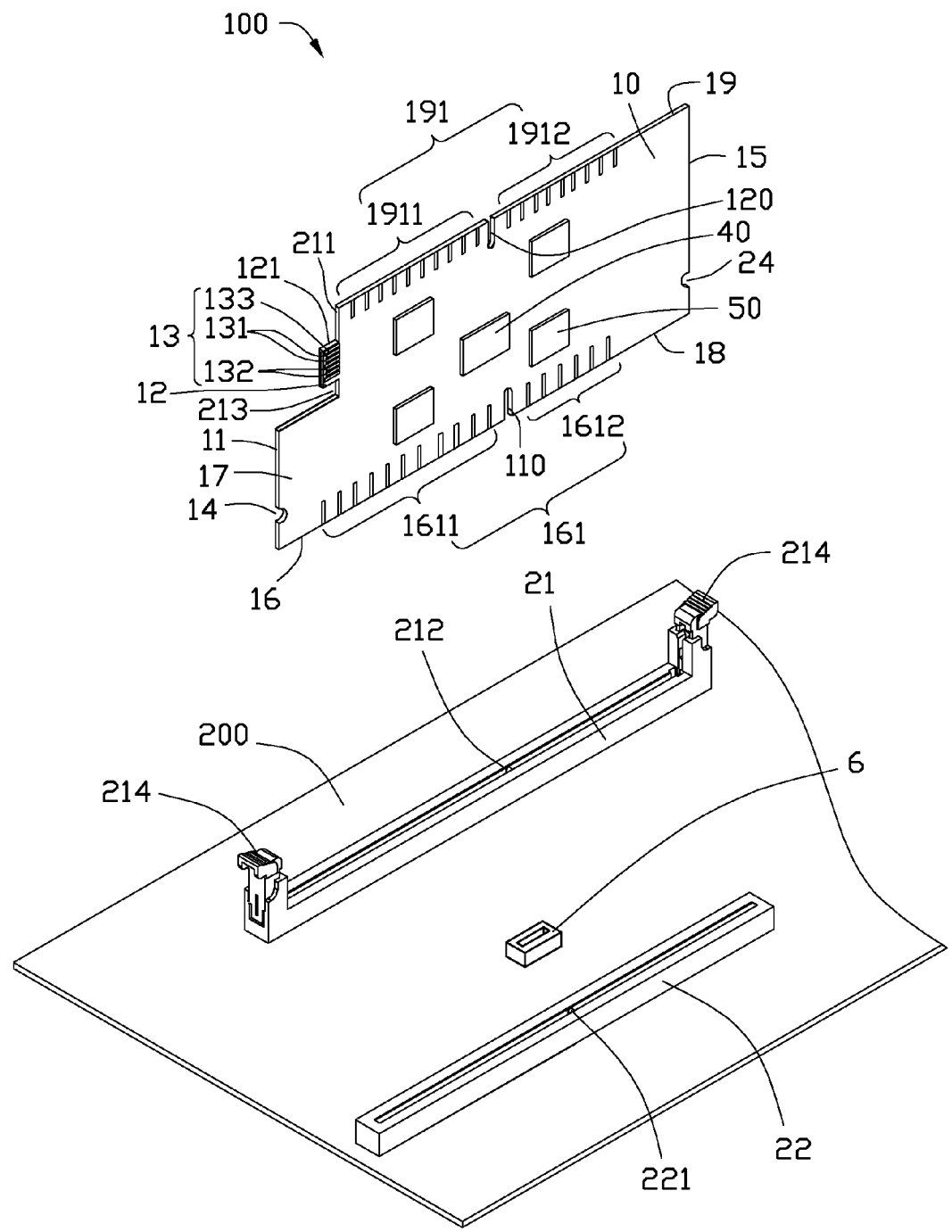
FIG. 1 is an exploded, isometric view of a serial advanced technology attachment (SATA) dual in-line memory module (DIMM), a double data rate type three (DDR3) memory slot, and a peripheral component interconnection express (PCIe) slot of a motherboard in accordance with an exemplary embodiment of the present disclosure.
Figure 2:
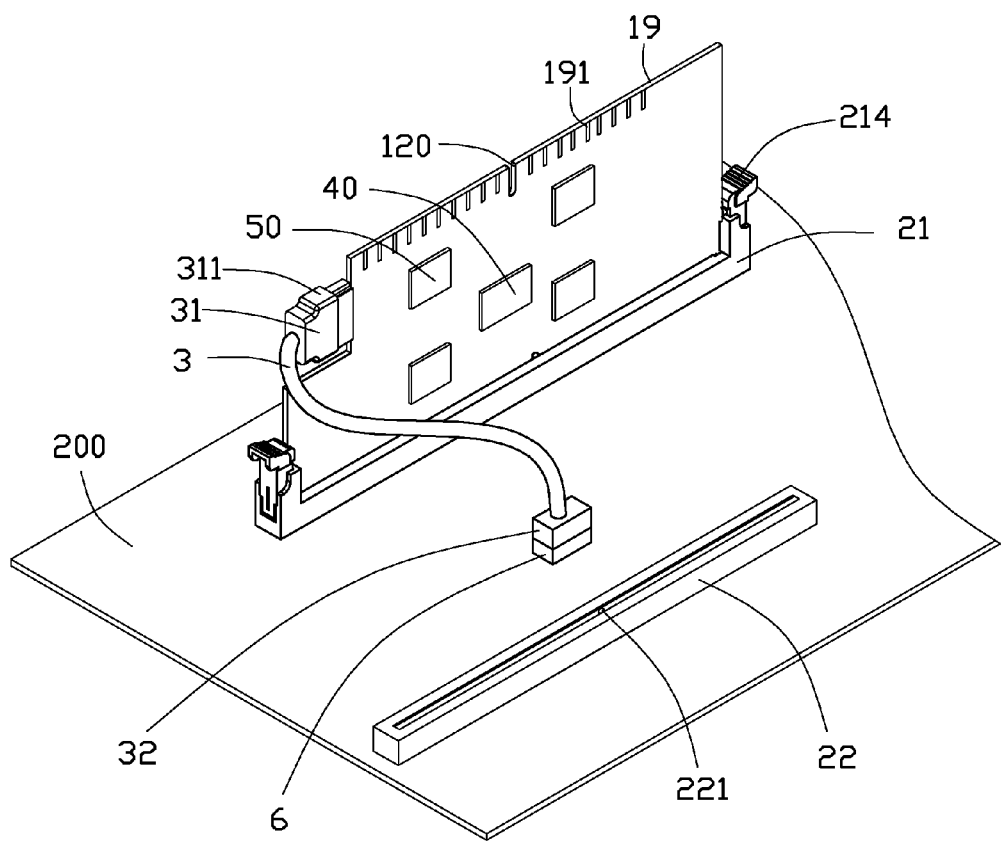
FIG. 2 is an assembled, isometric view of the SATA DIMM module of FIG. 1 connected to the DDR3 memory slot of the motherboard.
Figure 3:
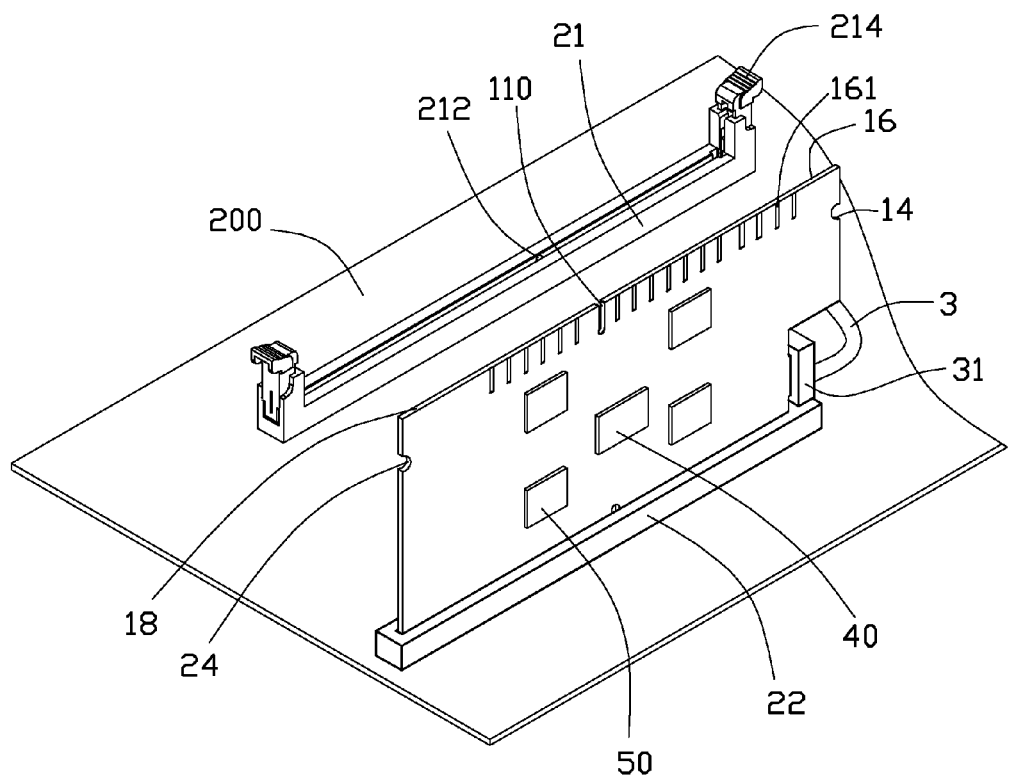
FIG. 3 is an assembled, isometric view of the SATA DIMM module of FIG. 1 connected to the PCIe slot of the motherboard.

Referring to FIGS. 1 to 3, a serial advanced technology attachment (SATA) dual in-line memory module (DIMM) module 100 in accordance with an exemplary embodiment includes a substantially rectangular circuit board 10. A control chip 40 and a plurality of storage chips 50 connected to the control chip 40 are arranged on the circuit board 10. Extending boards 12 and 17 extend from a first end 211 of the circuit board 10, and are coplanar with the circuit board 10. A bottom edge 16 of the extending board 17 is aligned with a bottom edge 18 of the circuit board 10. An edge connector 161 according with double data rate type three (DDR3) standard and a notch 110 are arranged on the bottom edges 16 and 18, to be inserted into an expansion slot, such as a DDR3 memory slot 21, of a motherboard 200. The edge connector 161 includes a plurality of power pins 1611 and a plurality of ground pins 1612. The power pins 1611 are connected to the control chip 40 and the storage chips 50. The ground pins 1612 are connected to a ground layer (not shown) of the circuit board 10.

A groove 14 is defined in an end 11 of the extending board 17, and is matched by a groove 24 defined in a second end 15 of the circuit board 10. An edge connector 13 is arranged on the extending board 12, and includes a pair of signal input pins 131, a pair of signal output pins 132, and three ground pins 133. The signal input pins 131 and the signal output pins 132 are connected to the control chip 40. The ground pins 133 are connected to the ground layer of the circuit board 10. A space 213 is defined between the extending boards 12 and 17. An edge connector 191 according with peripheral component interconnection express (PCIe) standard and a notch 120 are arranged on a top edge 19 of the circuit board 10 opposite to the bottom edge 18 of the circuit board 10. The edge connector 191 includes a plurality of power pins 1911 and a plurality of ground pins 1912. The power pins 1911 are connected to the control chip 40 and the storage chips 50. The ground pins 1912 are connected to the ground layer of the circuit board 10.

In one embodiment, the edge connector 13 accords with SATA standard. In other embodiments, the edge connector 13 can be arranged or attached on another side or end of the circuit board 10, such as on the top edge 19 or the second end 15, according to need.

The top edge 121 of the extending board 12 is lower than the top edge 19 of the circuit board 10. When the edge connector 13 is connected to a cable interface 31, the top surface 311 of the cable interface 31 is lower than the top edge 19 of the circuit board 10. Thus, there will be a total avoidance or reduction of any physical interference between the SATA DIMM module 100 and a chassis (not shown) when the SATA DIMM module 100 is mounted on a motherboard 200 accommodated in the chassis. The space 213 allows clearance for the bottom surface of the cable interface 31 opposite to the top surface 311 when connected.

Referring to FIGS. 1 and 2, when the SATA DIMM module 100 is connected to the DDR3 memory slot 21, the edge connector 161 is inserted into the DDR3 memory slot 21. A protrusion 212 of the DDR3 memory slot 21 engages in the notch 110. Fixing elements 214 at opposite ends of the DDR3 memory slot 21 engage in the grooves 14 and 24, to fix the SATA DIMM module 100 to the DDR3 memory slot 21. The edge connector 13 is connected to a storage device interface 6 of the motherboard 200 by a cable 3 with two cable interfaces 31 and 32. Under power, the motherboard 200 can output a voltage to the control chip 40 and the storage chips 50 through the DDR3 memory slot 21 and the edge connector 161. At the same time, the motherboard 200 outputs a control signal, such as a SATA signal to the control chip 40 through the storage device interface 6, the cable 3, and the edge connector 13, to enable communication between the motherboard 200 and the SATA DIMM module 100.

Referring to FIGS. 1 and 3, when the SATA DIMM module 100 is connected to a PCIe slot 22 of the motherboard 200, the edge connector 191 is inserted into the PCIe slot 22. A protrusion 221 of the PCIe slot 22 engages in the notch 120. The edge connector 13 is connected to the storage device interface 6 of the motherboard 200 by the cable 3. Under power, the motherboard 200 can output a voltage to the control chip 40 and the storage chips 50 through the PCIe slot 22 and the edge connector 191. At the same time, the motherboard 200 outputs a control signal, such as a SATA signal to the control chip 40 through the storage device interface 6, the cable 3, and the edge connector 13, to enable communication between the motherboard 200 and the SATA DIMM module 100.

The edge connectors 161, 191 allow the SATA DIMM module 100 to communicate with the motherboard 200 through either of the DDR3 memory slot 21 or the PCIe slot 22. Therefore, the SATA DIMM module 100 can increase storage capacity of the motherboard 200 even if no DDR3 memory slots are available on the motherboard 200.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A serial advanced technology attachment (SATA) dual-in-line memory module (DIMM) comprising:
    a circuit board;
    a control chip arranged on the circuit board;
    a plurality of storage chips arranged on the circuit board and connected to the control chip;
    a first extending board extending from a first end of the circuit board, a first edge connector arranged on the first extending board, to be connected to a storage device interface of a motherboard, wherein the first edge connector comprising a pair of signal input pins, a pair of signal output pins, and three first ground pins, the signal input pins and the signal output pins are connected to the control chip;
    a second extending board extending from the first end of the circuit board, a space defined between the first and the second extending boards, a bottom edge of the second extending board being in alignment with a bottom edge of the circuit board, a second edge connector arranged on the bottom edges of the second extending board and the circuit board, to be inserted into a first type of expansion slot of the motherboard, wherein the second edge connector comprises a plurality of second power pins connected to the control chip and the storage chips, and a plurality of second ground pins; and
    a third edge connector arranged on a top edge of the circuit board opposite to the bottom edge, to be inserted into a second type of expansion slot of the motherboard, wherein the third edge connector comprises a plurality of third power pins connected to the control chip and the storage chips, and a plurality of third ground pins.

2. The SATA DIMM module of claim 1, wherein the first edge connector accords with SATA standard.

3. The SATA DIMM module of claim 1, wherein the first edge connector is connected to a first cable interface at a first end of a cable, a second cable interface at a second end of the cable is connected to the storage device interface of the motherboard.

4. The SATA DIMM module of claim 3, wherein the circuit board is substantially rectangular, a top edge of the first extending board is lower than the top edge of the circuit board, when the first cable interface at the first end of the cable is connected to the first edge connector, a top surface of the first cable interface is lower than the top edge of the circuit board.

* * * * *